(12) United States Patent
Downey (10) Patent No.: US 6,503,430 B1
(45) Date of Patent: Jan. 7, 2003

(54) COLD RUNNER MOLDING SYSTEM

(76) Inventor: Philip Downey, 244 Mercury Cir., Pomona, CA (US) 91768

( * ) Notice: Subject to any disclaimer, the term of this patent is extended or adjusted under 35 U.S.C. 154(b) by 330 days.

(21) Appl. No.: 09/630,081

(22) Filed: Aug. 1, 2000

(51) Int. Cl.[7] ........................... B29C 39/12; B29C 45/16
(52) U.S. Cl. ........................ 264/161; 264/248; 264/255; 425/577
(58) Field of Search ................................. 425/573, 577, 425/543, 112, 116, 127, 129.1, DIG. 51, DIG. 58; 264/161, 255, 279, 275, 273, 246, 247

(56) References Cited

U.S. PATENT DOCUMENTS

| | | | | |
|---|---|---|---|---|
| 4,041,122 A | * | 8/1977 | Quick et al. | 264/277 |
| 5,626,808 A | * | 5/1997 | Miyajima | 264/161 |
| 5,672,365 A | * | 9/1997 | Ishii et al. | 425/127 |
| 5,683,641 A | * | 11/1997 | Jaskowiak | 264/267 |
| 5,702,731 A | * | 12/1997 | Hayakawa et al. | 425/125 |
| 6,203,745 B1 | * | 3/2001 | Wachsmann et al. | 264/328.7 |

* cited by examiner

Primary Examiner—Jan H. Silbaugh
Assistant Examiner—Emmanuel Luk
(74) Attorney, Agent, or Firm—Charles H. Thomas (57) ABSTRACT

An injection molding system for molding a hollow plastic article employs a hollow mold core having a longitudinal axis and a core runner cavity that has a uniform cross section throughout and which extends to the open end of the mold core. The mold core includes at least one core ejection gate and at least one core inlet gate leading from the outer surface of the core wall to the core runner cavity. When molding is performed in stages, there is it least one core ejection gate for each stage of molding. The core is clamped in between separate sets of molding blocks for each stage of molding. A core end closure cap having a core extension cavity aligned with the core runner cavity is used to close the open end of the mold core. A molten plastic is injected into the outer molding blocks and is confined to travel through the core inlet gate of the core without entering the mold cavity directly so that the molten plastic is forced to pass through the core runner cavity in order to reach the core ejection gates. Upon cooling, the core runner solidifies and is gripped and pulled longitudinally out of the core mold without leaving any residue of the plastic whatsoever.

4 Claims, 8 Drawing Sheets

COLD RUNNER MOLDING SYSTEM

BACKGROUND OF THE INVENTION

1. Field of the Invention

The present invention relates to an improved apparatus for injection molding hollow plastic articles and an improved method of molding hollow plastic articles.

2. Description of the Prior Art

The manufacturing process of injection molding has been used for many years to manufacture in bulk a wide variety of different types of plastic articles. Many of these articles are hollow structures. Articles may be made hollow in order to fit onto some other structure. Also, it is often much more economical to manufacture articles in a hollow rather than a solid form, both to reduce the weight of the plastic part and also to reduce the material expense involved in the manufacturing process.

For many years hollow plastic parts have been injection molded utilizing a mold comprised of two or more molding blocks having depressions therein which, when placed together, form a mold cavity. The molding blocks are separable along a parting interface. Prior to the introduction of molten plastic, a core structure is placed in between the molding blocks. Depressions in the molding blocks form one or more seats to hold the core in a proper, predetermined position within the mold cavity. The molding blocks are then closed upon the core to at least partially encapsulate it within the mold cavity. Molten plastic is then forced under pressure through a passageway formed by mating, concave channels in mating surfaces of the molding blocks to enter the mold cavity through a duct called a molding runner gate. The molten plastic is then forced into the mold cavity surrounding the core and fills the entire volume of the mold cavity except that portion of the volume of the mold cavity occupied by the core. The mold is then cooled so that the plastic solidifies to form a molded plastic structure. The core is then removed from within the molded plastic structure.

One problem that frequently arises when fabricating injection molded plastic parts in this manner is that a noticeable mark is formed on the area of the exterior surface of the plastic article that is formed at the runner gate. This mark may take the form of a protrusion, an indentation, or some other surface defect. In any event, the appearance of such a surface blemish is often unacceptable to the customer for whom the part is manufactured.

To remedy this defect the fabricators of plastic articles have sometimes attempted to introduce the molten plastic into the mold cavity through the mold core. To do this the mold core must be hollow in order for the molten plastic to flow through it. In such a system the molten plastic flows outwardly from the hollow center of the core through one or more ejection gates and into the mold cavity from the outer surface of the core, which forms the interior surface of the hollow plastic article. Since the interior surface of the plastic article is normally not visible, the appearance of surface blemishes on the interior surface of the molded article at the location of the ejection gates is normally not a matter of concern.

However, certain difficulties and disadvantages exist with the use of conventional molding systems of this type. Since the molten plastic is conducted through a passageway in the core, a certain amount of plastic is left within the passageway in the core once the molded plastic article has been formed. Plastic left in the core passageway is termed a "runner" and must the removed before the core can be used again. One conventional technique to accomplish this is to maintain the core in a heated condition even after the hollow plastic article has been formed so that the runner remains in a melted condition and can be poured in molten form from the core. Even in molding a plastic article in a single shot an additional amount of thermal energy is required, thus adding to the expense of the manufacturing process. Also, a step of inverting the core to pour the molten plastic from it is often required. The core is unavailable for service in manufacturing a subsequent hollow plastic part during the time that the melted plastic is being poured from it. As a consequence, the throughput of fabricated molded plastic articles is reduced. These problems are quite significant in the competitive field of injection molding.

This conventional technique of injection molding hollow plastic articles is particularly unsatisfactory when the articles to be fabricated are molded in several stages using plastics having different characteristics, for example different colors. In such a situation it is necessary not only to pour the molten runner from the core in order to remove it from the core, but it is also necessary to "purge" the core as well. That is, a certain amount of the next color of plastic to be used in the next stage of fabrication must be introduced into the runner passageway of the core and then poured out of the core while still in molten form in order to collect and carry with it residual amounts of the plastic used in the prior stage of fabrication. The plastic which is employed in the purging operation is discolored and is unsuitable for reuse. It must therefore be discarded as waste. This adds significantly to the cost of manufacturing each multicolored plastic article.

Furthermore, even with purging, not all of the prior plastic in the runner passageway comes out of the core. As a consequence, discoloration in the next subsequent shot of plastic is quite common. Moreover, since the core remains heated with the layer of plastic formed during the earlier stages of manufacture still on it, a loss of definition is likely to occur because the heated core maintains the preliminary portion of the article formed in a soft condition on the exterior surface of the core. This loss of proper definition in the shape of the portion of the article manufactured in the earlier stages of fabrication occurs because it is not possible to maintain the interior of the core in a heated condition without softening the portion of the plastic products already formed on the outer surface of the core. This produces a product of inferior quality. Moreover, because the core never really cools, the several layers of plastic molded onto the core tend to remain at too high a temperature. This causes them to mix at their interfaces, thus creating a further loss of definition at the interfaces between the different colors of plastic.

SUMMARY OF THE INVENTION

The present invention involves a system of injection plastic molding in which the molten plastic is injected into the mold radially outwardly from within a hollow, metal core. The core has opposing ends, at least one of which is an open end. The core has a longitudinal axis that extends between the opposing ends. The core has an outer surface, and defines within its interior, a core runner cavity that has a uniform, longitudinal cross section throughout relative to the longitudinal axis of the core. The core runner cavity extends through the open end of the core. A removable core end closure is located at the open end of the core and defines a core runner extension cavity within its structure. The core runner extension cavity of the end closure is in communication with the core runner cavity and is aligned on the longitudinal axis of the core.

Once the molten plastic has been injected into the mold cavity through the hollow core located therewithin, the mold halves are parted so that the core can be removed. Moreover, and unlike prior systems, the core does not need to be maintained in a heated state so that the plastic from within the core can be drained therefrom. Rather, the mold is allowed to cool. Even though the elongated runner within the hollow core cools, it can still be removed from the core even in a solidified state by merely uncapping the core, gripping the portion of the cold runner that has formed in the core runner extension cavity, and pulling the cold, solidified runner longitudinally out of the hollow core. The plastic runner is resilient enough so that it will pull free of the core. Indeed, the application of longitudinal tensile stress to the structure of the cold runner by pulling on the end of the cold runner that protrudes from the open end of the core has the effect of stretching the runner, thereby reducing its cross-sectional area. This facilitates its separation from the interior walls of the core runner cavity.

The present invention has significant advantages over the conventional hot runner extrusion molding systems. By allowing the core to cool at each stage of multiple stages of molding, the definition of each portion of the molded plastic structure is preserved so that there are clear demarcations between the portions of the article molded at different stages of the fabrication process. There is no mixing of colors at the interfaces between plastics of different colors as occurs in hot runner molding systems.

A very significant advantage of the present invention is that it avoids the step of purging entirely. Because the runner is removed from the core in cold, solidified form, no residue of plastic is left within the runner passageway or the ejection gates to contaminate the next shot of plastic of a different color injected into the core. As a consequence, mixing of colors from sequential shots of injection molded plastic is avoided entirely.

In one broad aspect the present invention may be considered to be a molding apparatus for injection molding plastic articles. The apparatus of the invention is comprised of an outer mold, a hollow mold core, and a removable core end closure. The outer mold is comprised of a plurality of molding blocks which are separable along a parting interface and which, when positioned together, define an enclosed article mold cavity therewithin. The hollow mold core has opposing ends, at least one of which is an open end. The mold core has a longitudinal axis that extends between the opposing ends. The mold core has an outer surface and also defines a core runner cavity therewithin. The core runner cavity has a uniform longitudinal cross section throughout relative to the longitudinal axis of the core. The core runner cavity extends through the open mold core end. At least one core ejection gate is defined within the core leading from the core runner cavity to the outer surface of the core. The removable core end closure is positionable at the open end of the core and defines a core runner extension cavity therewithin. The core runner extension cavity is in communication with the core runner cavity and is aligned on the longitudinal axis of the core.

The mold core is held in a fixed, predetermined position relative to the article mold cavity by a seat for the core defined by the molding blocks of the outer mold. A path of injected molten plastic flow is established into the core runner cavity, through the core ejection gates, and into the article mold cavity from inside the mold core when the core is within the outer mold and the mold blocks are positioned together.

The invention has particular applicability to the production of molded plastic articles formed in a sequence of stages utilizing plastics having at least one different characteristic at each stage. For example, the invention has particular applicability to forming hollow plastic articles formed from shots of plastic which are different in color, density, hardness, resiliency, permeability, or some other physical or chemical characteristic.

For molding plastic articles utilizing plastics having different characteristics which are injected in sequence during different stages of fabrication, the invention may be considered to be a molding apparatus for injection molding hollow plastic articles comprising a plurality of outer molds, a hollow mold core, and a removable core end closure. The outer molds are each comprised of a plurality of molding blocks which are separable from each other along a parting interface and which, when positioned together, define an enclosed article mold cavity. The mold cavities of the plurality of outer molds are each of a different shape and a different volume.

The hollow mold core has opposing ends, at least one of which is an open end. The mold core defines a longitudinal axis extending between the opposing ends. The mold core has an outer surface and defines a core runner cavity therewithin that has a uniform cross section throughout along the longitudinal axis. The cold runner cavity extends through the open mold core end. A plurality of core ejection gates are defined within the core leading from the core runner cavity through the wall of the core to the outer surface of the core.

The removable core end closure is positionable at the open end of the core. The core end closure defines a core runner extension cavity therewithin that is in communication with and longitudinally aligned with the core runner cavity. When the core is positioned within at least one of the outer molds, the molding blocks thereof block flow from at least one of the plurality of core ejection gates. More specifically, the molding blocks for all of the outer molds, except the outer mold for the last stage of injection molding, are configured to block at least one of the core ejection gates. As each stage of the plastic article is molded, the overlying portions of the article already formed will block flow through the core ejection gates used to form those portions. During the last stage of molding, the portions of the article already formed block all of the core ejection gates with the exception of those needed to form the final portion of the article.

Contamination and discoloration of subsequent stages of molding is thereby avoided. A molten plastic having a different physical characteristic, such as a different color, is employed at each stage of molding. Projections from the interior mold cavity walls of the mold blocks of each stage, except the final stage, block at least one core ejection gate at each molding stage except the final molding stage.

In another broad aspect the invention may be considered to be a method of molding a hollow plastic article utilizing at least one outer mold, a hollow mold core, and a core end closure. Each outer mold is comprised of a plurality of molding blocks which separate along a parting interface and which, when positioned together, define an enclosed outer mold cavity therewithin. The hollow mold core has opposing ends, at least one of which is an open end. The hollow mold core defines a longitudinal axis extending between the opposing ends. The mold core has an outer surface and defines a core runner cavity therewithin. The core runner cavity has a uniform cross section throughout relative to the longitudinal axis of the core. The core runner cavity extends through the open mold core end. At least one core ejection gate is defined within the core leading from the core runner cavity to the outer surface of the core. The core end closure is positioned relative to the core to block the open end of the core. The core end closure defines a core runner extension cavity therewithin that is in communication with the core runner cavity and is aligned on the longitudinal axis of the core.

The steps of the method of the invention comprise: withdrawing the core blocks from each other; placing the mold core between the molding blocks; positioning the molding blocks together, thereby clamping the mold core therebetween at least partially within the outer mold cavity; closing the open end of the mold core with the core end closure; injecting molten plastic into the outer mold cavity through the core runner cavity and the core ejection gate; cooling the outer mold and the mold core, thereby solidifying the molten plastic injected into the outer mold cavity into a molded plastic structure mounted on the mold core and thereby solidifying the molten plastic injected into the core runner cavity and the core runner extension into a solidified core runner occupying both the core runner cavity and the core runner extension cavity; removing the core end closure from the open end of the mold core, thereby exposing that portion of the core runner solidified in the core runner extension cavity; gripping the core runner by the exposed portion thereof and drawing the solidified core runner along the longitudinal axis completely out of the core runner cavity; drawing the molding blocks apart; and thereafter removing the molded plastic structure from the mold core.

The method of the invention has very considerable advantages as contrasted with conventional hot runner injection molding systems when implemented to form plastic articles with different portions formed of different plastics having at least one characteristic different from each other. For example, considerable advantages are to be gained by using the invention to form plastic articles with portions of different colors.

To fabricate articles having portions formed of different plastics at least first and second stage outer molds are utilized in the performance of the steps previously described. The molding blocks of the first stage outer mold have interior walls that define a first stage mold cavity and include port-blocking projections that extend into the first stage mold cavity. The mold blocks of the second stage outer mold have interior walls that define a second stage mold cavity which is larger in volume than the first stage mold cavity. The second stage mold cavity totally encompasses the first stage mold cavity. The mold core which is utilized has a plurality of core ejection gates defined within the core leading from the core runner cavity to the outer surface of core.

To mold a plastic article utilizing first and second outer mold stages, all of the steps of the invention previously described, except the final step of removing the molded plastic structure from mold core, are first performed utilizing the first stage outer mold. During the step of injection in the first stage at least one of the core injection gates is blocked by projections formed on the interior walls of the molding blocks of the first stage outer mold. These projections are brought into position to block one or more of the core ejection gates as the core blocks of the first stage outer mold are brought together to clamp the core mold therebetween.

After the first stage of molding both the molded plastic structure formed on the outer surface of the core and the core runner are cooled so that they solidify. At this point a portion of the plastic article is formed on the outer surface of the core during the first stage of molding. The end closure is then removed from the open end of the core. The portion of the core runner formed within the core runner extension cavity during the first stage of molding is thereupon exposed. This portion is gripped and pulled longitudinally thereby drawing the entire core runner out of the core runner cavity. The thermoplastic utilized is soft enough so that, as tensile stress is exerted, the core runner is stretched and the cross-sectional area of the core runner is reduced. This facilitates separation of the core runner from interior walls defining the core runner cavity. Also, the thermoplastic utilized is soft enough so that the short, radially projecting branches from the main body of the core runner produced by the thermoplastic remaining in the core ejection gates will pull free from the core ejection gates and will be withdrawn along with the main body of the core runner. The molding blocks of the first stage outer mold are then drawn apart.

All of the steps of the method of the invention are then performed utilizing the second stage outer mold and utilizing a second plastic in the step of injection that has at least one characteristic different from the molten plastic employed in the injection step utilizing the first stage outer mold. If the method of the invention is performed utilizing only two stages of molding, the molded plastic structure is removed from the mold core following the second stage of molding. However, the invention may be performed with three, four, or even a greater number of stages of molding. In any event, the plastic structure is built up on the core at each molding stage and remains on the core until after the final stage of molding has been performed.

The invention may be described with greater clarity and particularity by reference to the accompanying drawings.

DESCRIPTION OF THE EMBODIMENT

Figure 1:
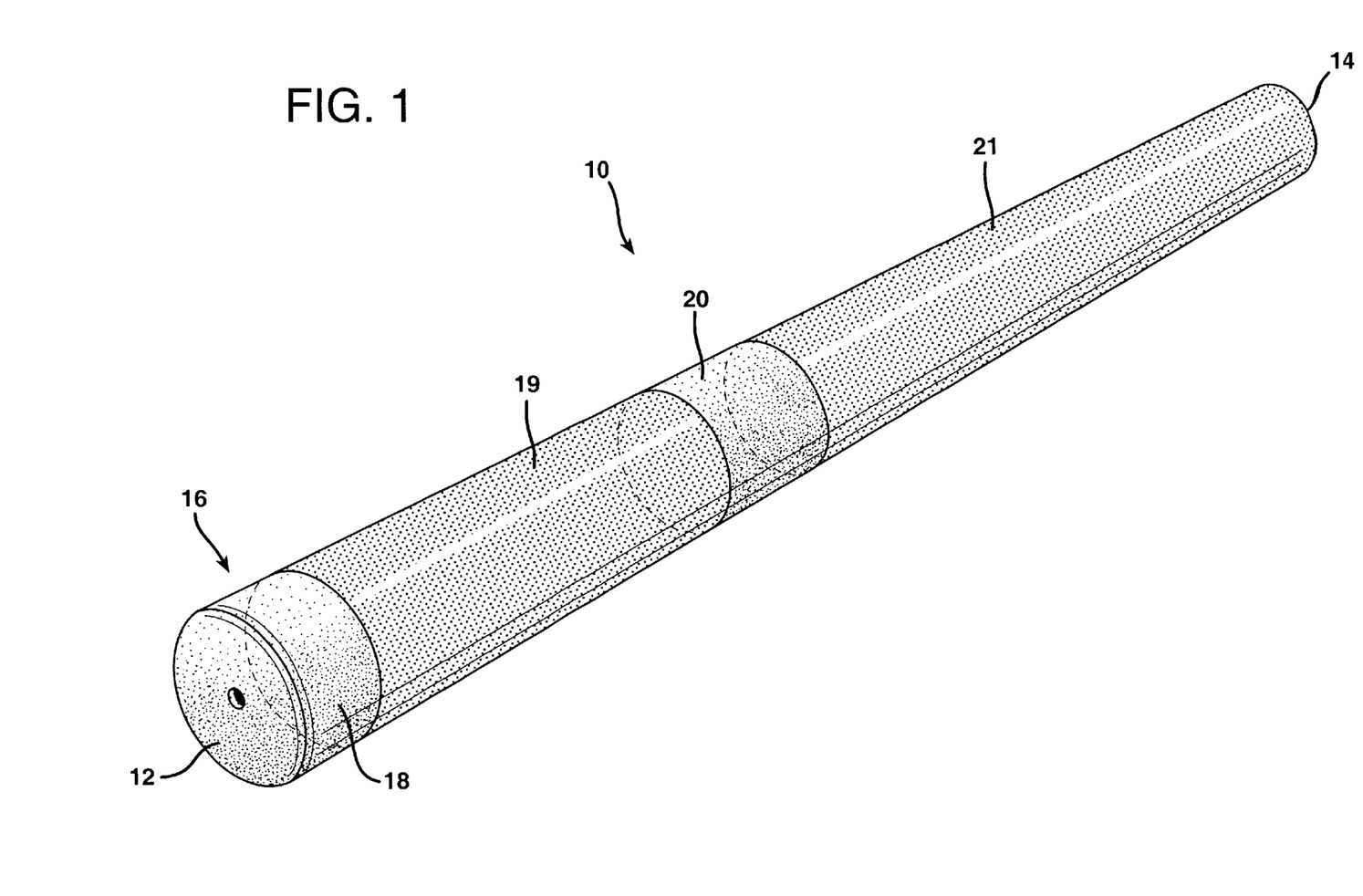
FIG. 1 is a perspective view of a golf club grip fabricated according to the present invention from plastics of two different colors.

FIG. 1 illustrates a thermoplastic rubber golf club grip 10 produced according to the invention. The golf club grip 10 is a hollow, elongated tubular structure that is nearly cylindrical in shape, but which has an outer surface that is tapered very slightly from a closed end 12 to an opposite open end 14. The golf club grip 10 has a circular, annular cross section throughout its length.

The golf club grip 10 is formed in two portions at two stages of molding from plastics of different colors. The main body of the grip 10 is formed as a socket indicated generally at 16 during a first stage of molding. The inner, socket portion 16 is formed with the closed end 12 and a pair of radially outwardly projecting, narrow bands 18 and 20 exposed adjacent the closed end 12 and about midway along the length of the golf club grip 10 as illustrated. The remaining portion of the longitudinally extending outer surface of the socket portion 16 is radially recessed from the radially outer surfaces of the bands 18 and 20. In the second stage of molding, much wider plastic bands 19 and 21 are formed to fill the radially indented sections of the first stage socket portion 16. The bands 19 and 21 are molded from a different color of thermoplastic than the main body socket portion 16.

Figure 8:
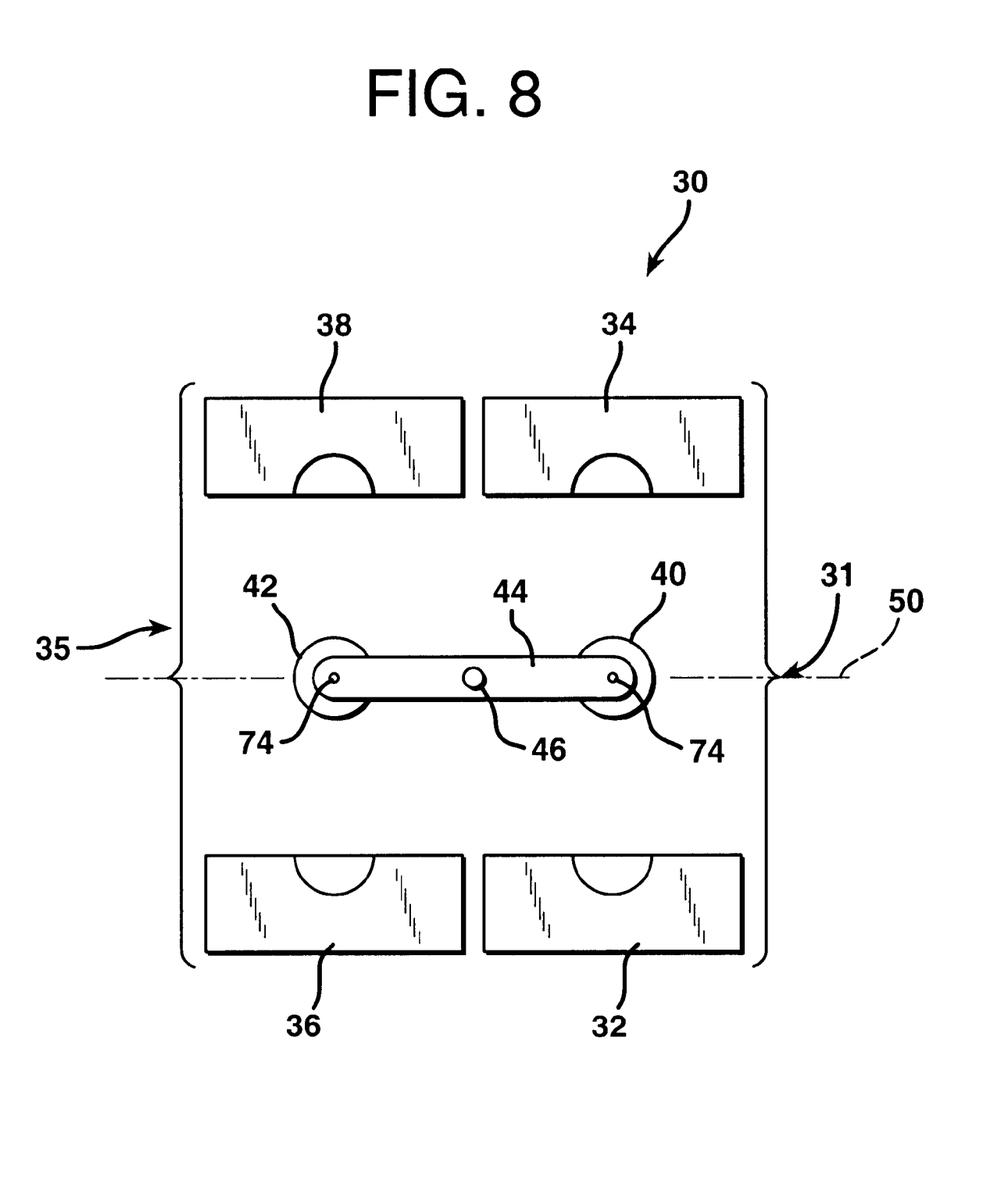
FIG. 8 is a top plan view showing the entire molding apparatus of the invention in which the golf club grip of FIG. 1 is formed.

FIG. 8 illustrates a molding apparatus according to the invention generally at 30. The molding apparatus 30 includes a first stage outer mold 31 formed of a pair of mirror image P-20 steel die section molding blocks 32 and 34 and a second stage outer mold 35 formed of a pair of mirror image P-20 steel die section molding blocks 36 and 38. All of the molding blocks 32, 34, 36, and 38 are provided with conventional, internal ducting (not shown) which conducts cooling water therethrough. A pair of identical first and second hollow steel molding cores 40 and 42 are both oriented vertically and carried at opposite ends of a horizontally disposed overhead support 44.

The support 44 is rotatable about a vertical axle 46 that is located centrally between the first stage mold 31 formed by the molding blocks 32 and 34 and the second stage mold 35 formed by the molding blocks 36 and 38. All of the molding blocks 32, 34 and 36, 38 of both mold stages are vertically oriented and part along a planar vertical interface 50. The mating molding blocks 32 and 34 of the first stage mold 31 and the mating molding blocks 36 and 38 of the second stage mold 35 are moved concurrently, toward and away from the interface parting plane 50 during the molding process. When the molding blocks 32, 34, 36, and 38 are drawn apart, as shown in FIG. 8, the support 44 can be rotated 180 degrees. In this way the first and second hollow mold cores 40 and 42 can be moved alternatingly and cyclically between the first and second stage outer molds 31 and 35, respectively.

Figure 2:
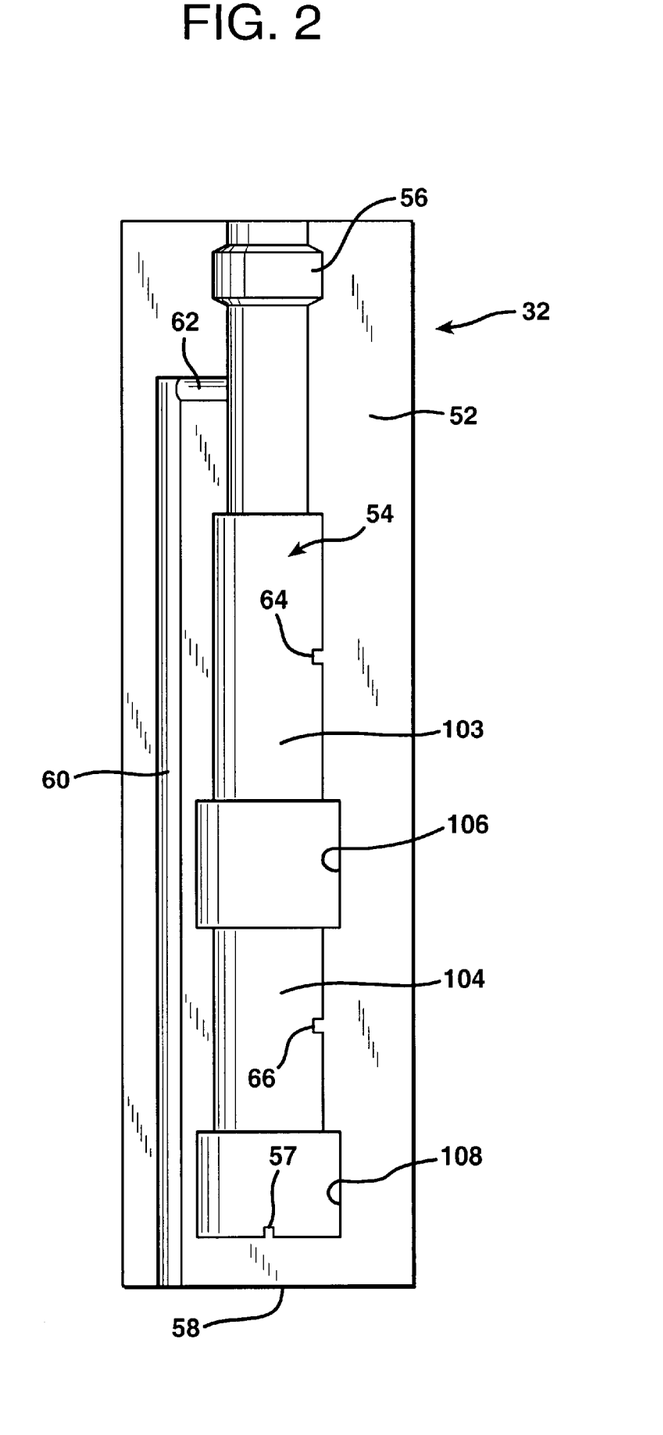
FIG. 2 is an elevational view taken along the parting interface of one of the molding blocks of the first stage of an outer mold used to produce the golf club grip of FIG. 1.

FIG. 2 is an elevational view of the molding block 32 of the first stage mold 31 as viewed from the interface parting plane 50 of FIG. A. A similar view of the first stage molding block 34 from the parting plane 50 in the opposite direction therefrom would appear as the mirror image of FIG. 2.

Each of the first stage molding blocks 32 and 34 has a vertical, planar parting face 52 into which an elongated, configured concave molding depression 54 is defined. When the first stage mold halves 32 and 34 are brought together and their respective planar parting faces 52 meet at the interface plane 50, the configured depressions 54 of the molding blocks 32 and 34 define an enclosed first stage article mold cavity. The elongated, concave depressions 54 also define a mold core seat, one-half of which is indicated at 56 in FIG. 2, and also a mold passageway leading from the exterior of the first stage outer mold 31 to a mold block gating port defined at the interior surfaces thereof. The elongated, longitudinal channel 60 that is oriented parallel to the configured mold depression 54 of the molding block 32 forms one-half of the gating passageway, while the short, transverse channel 62 defined in the parting face 52 of the first stage molding block 32 forms one-half of the mold block gating port. The other halves of the mold passageway and the first stage mold block gating port are formed by corresponding mirror image channels defined in the parting face 52 of the other first stage molding block 34.

Opposite the mode core seating depressions 56 each of the first stage molding blocks also defines a small, short, longitudinal, inwardly projecting, semicylindrical position projection 57. Together the small projections 57 define a short, axial core positioning post.

Each of the molding blocks 32 and 34 has a pair of port blocking projections 64 and 66 that are formed in its inner, concave surface 54 at the parting face 52. When the molding blocks 32 and 34 are positioned together at the interface plane 50, the upper pair of blocking projections 64 block flow from an upper mold core ejection gate while the pair of blocking projections 66 of the first stage molding blocks 32 and 34 block flow from a lower mold core ejection gate, as will hereinafter be described.

Figure 3:
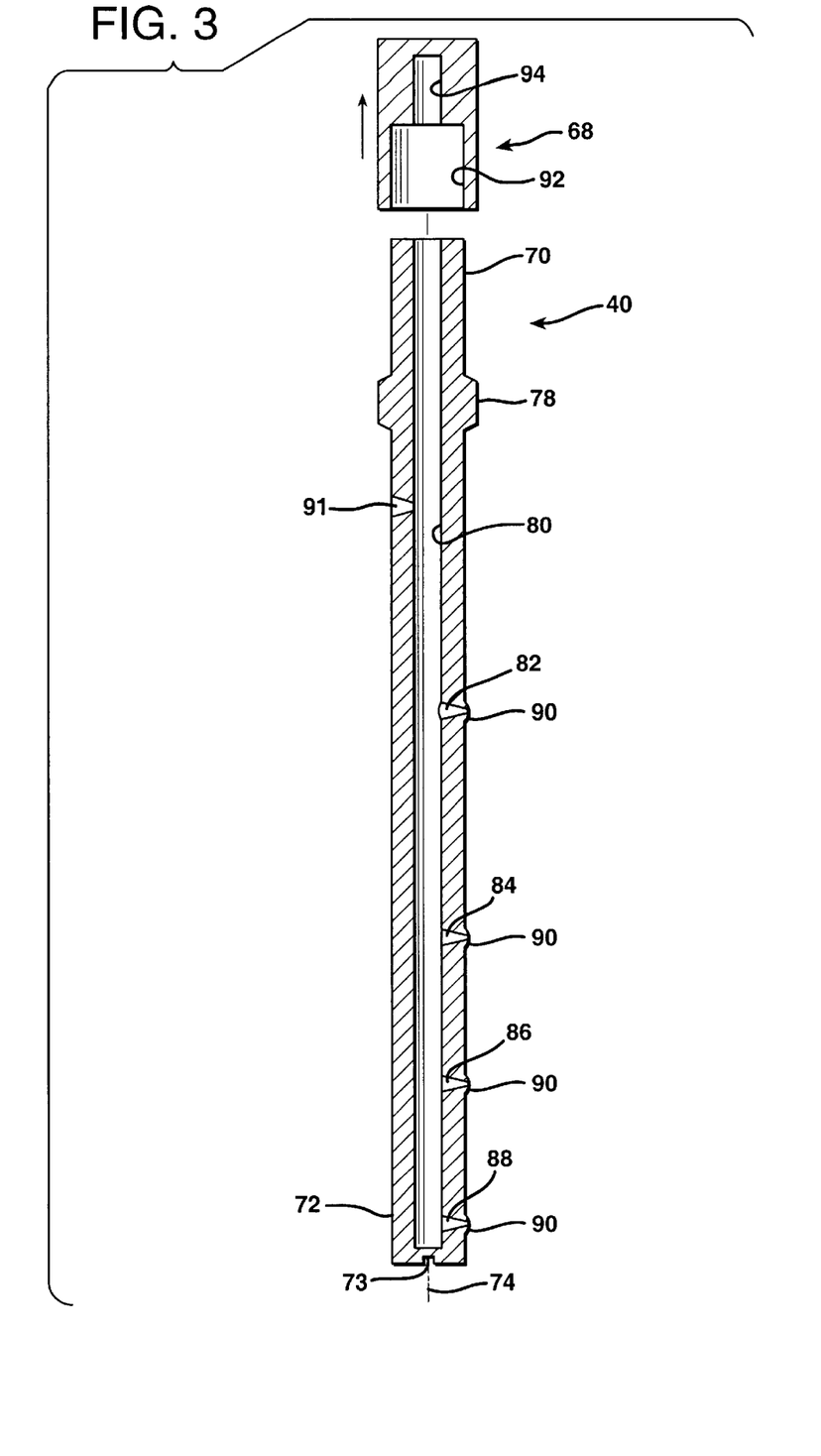
FIG. 3 is a sectional elevational view illustrating the mold core and the removable core end closure of the molding apparatus of the invention.

FIG. 3 illustrates a single one of the hollow mold cores, specifically the mold core 40. The mold core 42 is identical in construction to the mold core 40. Each of the mold cores 40 and 42 is formed as an elongated, and generally cylindrical structure having opposing ends. Each mold core 40 and 42 has a single open upper end 70 and a single lower, closed, blind end 72 having a positioning recess 73 defined therein. The lower blind end 72 of each mold core 40 and 42 is located within the mold cavity of the mold 31 or 35 with which it is aligned. The open end 70 of each mold core 40 and 42 projects upwardly through openings in the mold blocks at the parting interface plane 50 and extends above the outer molds 31 and 35 of the molding apparatus 10 when the molding blocks 32, 34 and when the molding blocks 36 and 38 are positioned together. Each mold core 40 and 42 has a vertically oriented longitudinal axis 74 that extends between the opposing ends 70 and 72. The mold cores 40 and 42 each have an outer surface 76, visible in FIG. 4. The outer surface 76 is generally cylindrical in shape, but defines, near the upper end 70 of each mold core, a radially outwardly projecting annular seating ring 78. The outer, convex surface of the seating ring 78 seats snugly into the concave channel-shaped seat halves 56 defined on the concave interior wall surfaces of the depressions formed in the parting faces of all of the molding blocks 32, 34, 36, and 38.

As shown in FIG. 3, each of the hollow mold cores 40 and 42 also defines an elongated core runner cavity 80 therewithin that has a uniform longitudinal cross section throughout relative to the longitudinal axis 74. Preferably, the core runner cavity 80 has a circular cross section. The core runner cavity 80 extends through the open, upper mold port end 70, but terminates as a blind well at the lower, closed end 72.

Each core 40 and 42 must have at least one core ejection gate, and in the plural stage molding apparatus 10 depicted and described, there are several core ejection gates 82, 84, 86, and 88 in each of the mold cores 40 and 42. Each core ejection gate 82, 84, 86, and 88 is shaped as a generally frustoconical channel directed radially outwardly from the longitudinally oriented core runner cavity 80 with an opening on the outer surface 76 of the mold core. The outer surface 76 of each mold core is formed with a raised, radially outwardly directed bubble or blister-shaped protuberance 90 at the circular opening formed by the radially outer extremity of each ejection core gate 82, 84, 86, and 88. The provision of the protuberances 90 offsets the tendency for the molten plastic to form radially inwardly projecting bubbles on the inner surface of the portions of the sequential stages of the golf club grip 10 as they are formed. Such bubbles or humps can interfere with the insertion or proper seating of the end of the golf club shaft into the golf club grip 10.

Each of the mold cores 40 and 42 also defines at least one core inlet gate 91 leading from the outer surface 76 of the mold core to the core runner cavity 80 located therewithin. The core inlet gate 91 has a generally frustoconical configuration and narrows from its greatest diameter at its radial outer extremity at the outer core mold surface 76 to its smallest diameter where it intersects the longitudinal, cylindrical core runner cavity 80.

Figure 4:
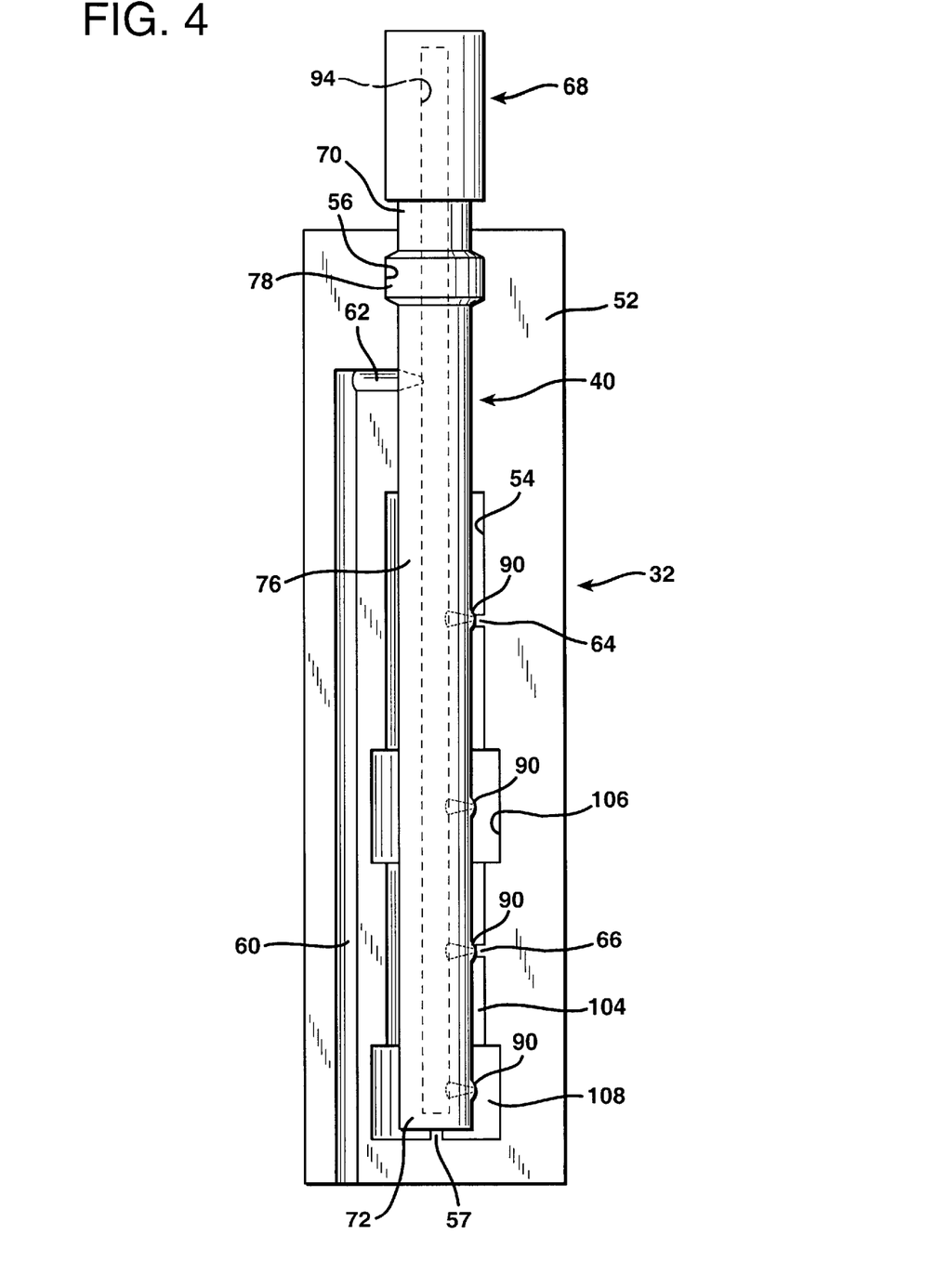
FIG. 4 is an elevational view showing the molding block of FIG. 2 with the mold core and removable core end closure in position in preparation for the first stage of molding of the golf club grip of FIG. 1.
Figure 5:
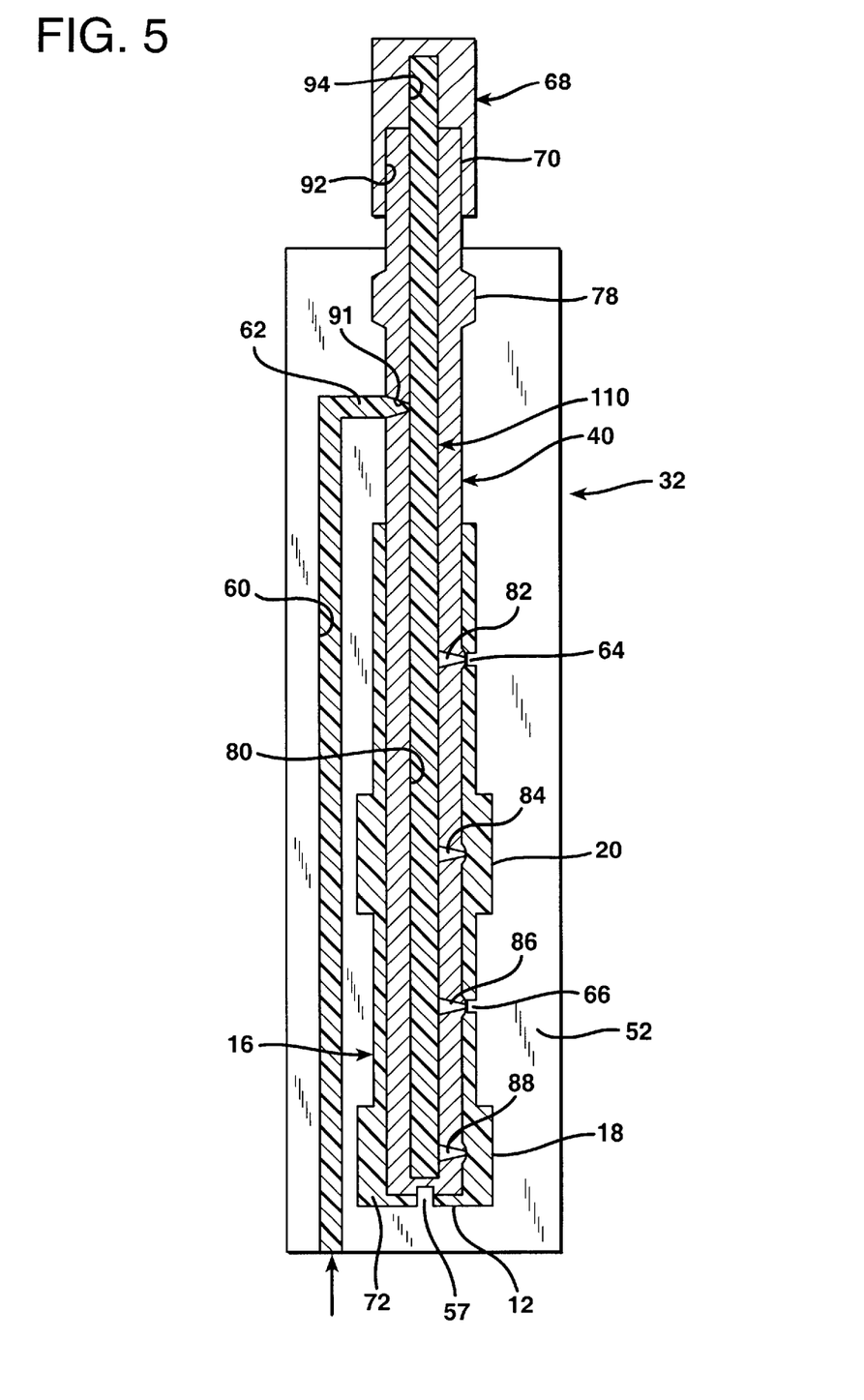
FIG. 5 is a sectional elevational view illustrating the first stage of molding of the golf club grip of FIG. 1 using the molding apparatus of the invention.

Each of the mold cores 40 and 42 is provided with a separate, removable core end closure 68. Each core end closure 68 has an annular, interior wall 92 formed at a diameter that fits snugly against the outer, convex cylindrical surface 76 at the upper end 70 of the mold core associated therewith. The removable core end closure 68 forms a removable cap for the upper open end 70 of the mold core 40 or 42 atop which it is mounted. The core end closure 68 is engaged with a leakproof, friction tight fit on the open end 70 of a mold core, as illustrated in FIGS. 4 and 5. Each core end closure 68 also defines a smaller diameter blind well 94 that is also aligned on the longitudinal axis 74 of the core. When the core end closure 68 is in position atop the open upper end 70 of the mold core 40 or 42, the core runner extension cavity 94 is in communication with the core runner cavity 80. While the diameter of the core runner extension 94 is smaller than the diameter of the annular, interior wall 92, it should be at least as great as the cross-sectional area of the core runner cavity 80. Preferably, the runner extension cavity 94 of the removable core end closure 68 has the same diameter and cross section as the core runner cavity 80.

Figure 7:
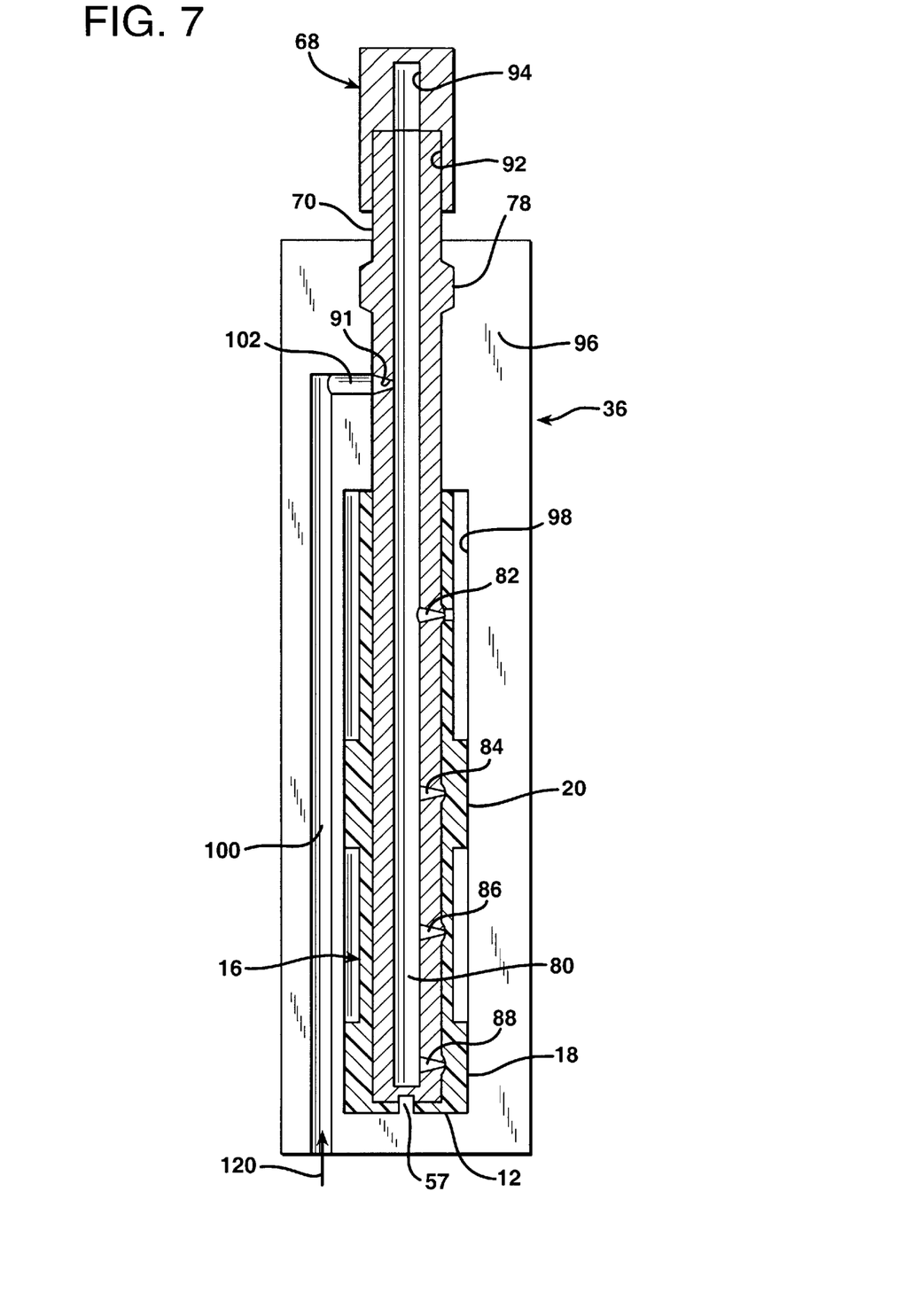
FIG. 7 is a sectional elevational view illustrating the second stage of molding of the golf club grip of FIG. 1.

FIG. 7 illustrates the molding core 40 disposed in position within the second stage outer mold as viewed from the mold parting plane 50 shown in FIG. 8 in a direction looking toward the second stage molding block 36. The second stage molding block 36 has a vertical, planar parting face 96 into which an elongated, concave, generally trough-shaped, configured interior surface 98 is formed. An elongated, longitudinal channel 100 that leads from the exterior, lower end of the second stage mounting block 36 and a short, transverse concave channel 102 at the upper extremity of the channel 100 are also formed into the parting face 96. The axial depression 98 at the longitudinal center of the second stage molding block 36, the longitudinal channel 100, and the transverse channel 102, have mating, mirror image counterpart recesses and channels formed in the parting face 96 of the other mating, second stage molding block 38. Together the channels 100 in the parting faces 96 of the second stage molding blocks 36 and 38 form a mold gating passageway leading from the exterior of the outer mold 35 formed by the molding blocks 36 and 38 to a mold block gating port formed by the transverse channels 102.

The mold block gating port formed by the transverse channels 102 of the second stage molding blocks 36 and 38 is in direct communication with the core inlet gate 91 of each of the mold cores 40 and 42 when the mold cores 40 and 42 are alternatingly clamped into the second stage mold 35 between the mold halves 36 and 38 thereof. Similarly, the mold block gating port formed by the transverse channels 62 in the parting faces 52 of the first stage molding blocks 32 and 34 is in direct communication with the core inlet gate 91 of the other of the mold cores 40 and 42.

Each of the mold cores 40 and 42 is alternatingly clamped in between the first stage molding blocks 32 and 34 and between the second stage molding blocks 36 and 38. In both cases portions of the pairs of outer mold blocks 32, 34 and 36, 38 contact the outer surface 76 of the mold core 40 or 42 seated therewithin. The structures of the pairs of outer mold blocks 32, 34 and 36, 38 make tight contact with the outer surface 76 of the mold core trapped therewithin at and a short distance below the seating ring 78 so that all flow from the mold block gating ports is directed exclusively into the core inlet gates 91 of the mold cores 40 or 42 within each outer mold. Molten plastic cannot escape from the mold block gating ports formed by the pairs of channels 62 and 102 into the mold cavities directly, but is first forced through the core inlet gates 91 and into the core runner cavity 80.

When the first stage molding blocks 32 and 34 are positioned together with the parting faces 52 pressed together, the concave depressions 54 thereof define an enclosed first stage article mold cavity. Similarly, when the second stage molding blocks 36 and 38 are positioned together with parting faces 96 into intimate contact with each other, the concave depressions 98 thereof together form a second stage mold cavity. However, the mold cavities formed by the first and second stage pairs of molding blocks 32, 34 and 36, 38 are each of a different shape and of a different volume. More specifically, the interior walls of the second stage outer mold blocks 36 and 38 that form the depressions 98 define a second stage mold cavity volume which is larger than the volume of the first stage mold cavity formed between the molding blocks 32 and 34. The second stage mold cavity defined between the concave surfaces 98 also totally encompasses the first stage mold cavity formed by the interior wall surfaces defining the depressions 54 of the pair of molding blocks 32 and 34.

It should be noted that the interior walls forming the depressions 98 of the second stage outer mold blocks 36 and 38 do not include projections corresponding to the projections 64 and 66 of the molding blocks 32 and 34 that extend into the interior of the mold cavity formed between the mating depressions 54. The depressions 54 in the molding blocks 32 and 34 include elongated but relatively small diameter, nearly cylindrical segments 103 and 104 and relatively larger diameter but much shorter segments 106 and 108. The short but larger diameter segment 106 is located between the longer but smaller diameter segments 103 and 104 of each of the first stage molding blocks 32 and 34. The larger diameter segment 108 is located at the lower extremity of the smaller diameter segment 104 in each of the first stage molding blocks 32 and 34. The smaller diameter segments 103 and 104 are slightly larger in diameter than the diameter of the outer surface 76 of the mold cores 40 and 42.

The configuration of the depressions 98 in the second stage molding blocks 36 and 38 is generally cylindrical with only a very slight taper from the closed, blind end of the second stage mold 35 toward its open, upper end. The diameter of the depression 98 is substantially the same as the diameters of the larger diameter segments 106 and 108 in the depressions 54.

To manufacture the golf club grip 10, the first stage molding blocks 32 and 34 and the second stage molding blocks 36 and 38 of the molding apparatus 30 are first withdrawn from each other and the cores 40 and 42 are placed therebetween with their axes 74 aligned on the parting plane 50, as illustrated in FIG. 8. The first stage molding blocks 32 and 34 and the second stage molding blocks 36 and 38 are then concurrently moved toward each other and toward the interface plane 50 so that the parting plane faces 52 of the first stage mold blocks 32 and 34 and the parting plane faces 96 of the second stage molding blocks 36 and 38 are in tight, intimate leakproof contact with each other. By clamping the outer molding block pairs together, the core molds 40 and 42 are respectively clamped by the first stage outer mold 31 between the first pair of molding blocks 32, 34 and by the second stage outer mold 35 by the second pair of molding blocks 36, 38.

The seating rings 78 of the mold cores 40 and 42 are seated within the core seats of the molding blocks defined by the seating recesses 56 thereof. Also, the positioning pins formed by the axial projections 57 extend into the axial recesses 73 of the mold cores 40 and 42. As a consequence, the mold cores 40 and 42 will be uniformly located within the molding cavities each time the pairs of molding blocks are brought together.

When the pairs of molding blocks 32, 34 and 36, 38 are clamped together, the upper end 70 of each mold core 40 and 42 protrudes from the top of the molding blocks between which it is clamped, but the remaining lengths of the mold cores 40 and 42 are located and clamped within the outer mold cavities formed by the pairs of depressions 54 and 98 in the manner illustrated in FIG. 4 and in the manner illustrated in FIG. 7.

With the molding blocks 32 and 34 clamped together with the mold core 40 seated therebetween as shown in FIG. 4, the pair of raised protuberances 64 and 66 form port blocking projections that extend into the first stage mold cavity formed by the depressions 54 to block flow from at least one of the core ejection gates. More specifically, in the embodiment of the molding apparatus 30 illustrated, the port blocking projections 64 extend into the first stage mold cavity to totally block flow from the uppermost core ejection gate 82 while the projections 66 extend into the first stage mold cavity to totally block flow out of the core ejection gate 86. The projections 64 and 66 form a seal across the extrusion apertures of the core ejection gates 82 and 86 during the first molding stage. The raised protuberances 90 at each of the core ejection gates project outwardly very slightly into the mold cavities of the outer molds formed by the molding block pairs 32, 34 and 36, 38 when the pairs of mold blocks 32, 34 and 36, 38 are positioned together with the mold cores 40 and 42 located therebetween.

Molten plastic of a first, selected color is then injected into the first stage mold 31 through the passageway formed by the channels 60 to the mold block gating port formed by the channels 62 and into the mold core cavity 80 through the core inlet gate 91 leading thereto from the outer surface 76 of the core mold 40. The tight fit of the surfaces of the molding blocks 32 and 34 against the outer surface 76 of the mold core 40 adjacent the core inlet gate 91 confines all of the molten plastic flow to the gate 91, and prevents any plastic from traveling directly into the mold cavity.

The molten plastic fills the mold core 80 and the mold core cavity extension 94 and is forced out into the first stage mold cavity formed between the depressions 54, as illustrated in FIG. 5. The plastic injected during the first molding stage forms the main body socket 16 of the golf club grip illustrated in FIG. 1. This socket 16 includes a thin inner tube that extends the length of the golf club grip 10 with thicker, radially projecting bands 18 and 20 defined thereon. The underlying tube of the socket 16 is formed throughout the length of the cavities 54, and the bands 18 and 20 are formed at the enlarged diameter cavity sections 106 and 108. It should be noted, however, that the protrusions 64 and 66 form access holes through the inner socket tube. These access holes are necessary to permit the formation of the outer second stage portions 19 and 21 of the golf club grip 10.

Once the first portion of the golf club grip has been formed during the first molding stage, the mold halves 32 and 34 are cooled, as is the mold core 40. This solidifies the molten plastic material injected into the first stage outer mold cavity into a molded plastic socket structure 16 mounted on the mold core 40. The step of cooling also solidifies the molten plastic injected into the core runner cavity 80 and the core runner extension 94 into a solidified core runner 110 that occupies both the core runner cavity 80 and the core runner extension cavity 92.

The core end closure cap 68 is then removed from the open end 70 of the mold core 40, thereby exposing that portion of the core runner 110 that solidified in the core runner extension cavity 94. This upper, exposed portion 112 is illustrated in phantom in FIG. 6 in the position that it occupies immediately upon removal of the end closure cap 68.

Figure 6:
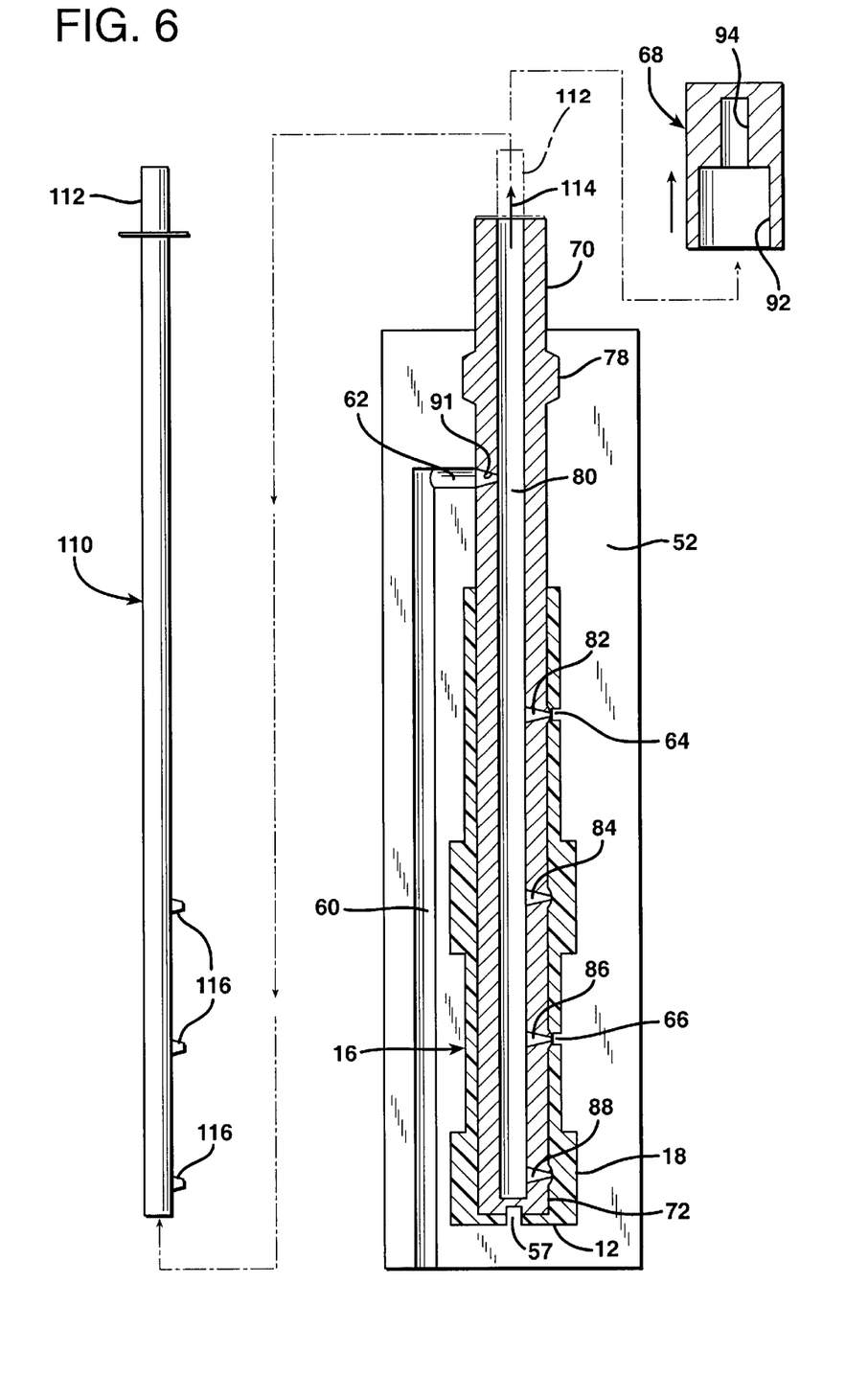
FIG. 6 is a sectional elevational view illustrating the extraction of the cold runner from the mold core of FIG. 3.

The core runner 110 is then gripped by the exposed portion 112 thereof. The entire solidified core runner 110 is then drawn along the longitudinal axis 74 of the core mold 40 out of the core runner cavity 80, as illustrated in solid lines in FIG. 6. If frictional resistance occurs, the core runner 110 is soft enough so that it stretches and is reduced slightly in diameter as tension is increased in the direction indicated by the directional arrow 114 in FIG. 6. The reduction in diameter of the core runner 110 aids in dislodging it from the core runner cavity 80. Also, the material of the thermoplastic is resilient enough and the radially projecting, frustoconical protrusions 116 that are created on the core runner 110 at the locations of the ejection gates 82,84, 86, and 80 are short enough that the protrusions 116 will also pull free when a longitudinal force in the direction 114 is exerted. The core runner 110 with the protrusions 116 thereon is thereby pulled completely free from the core 40 as illustrated in FIG. 6.

The first molding blocks 32 and 34, as well as the second stage molding blocks 36 and 38, are thereupon drawn apart and withdrawn from the parting interface plane 50 to the positions illustrated in FIG. 8. The first stage of molding is thereupon complete. At this point in time the socket 16, with its radially outwardly directed, bands 18 and 20 remains in position as molded upon the core 40.

The horizontally oriented core support 44 is then rotated 180 degrees about the vertical axle 46. This reverses the positions of the cores 40 and 42. That is, the core 40 thereupon resides between the second stage molding blocks 36 and 38, while the core 42 resides between the first stage molding blocks 32 and 34 on the parting interface plane 50.

The pairs of both the first and second stage core molding blocks are then brought together again. The core mold 40 is thereby clamped between the second stage molding blocks 36 and 38 with its upper end 70 protruding from openings in the top of the second stage molding blocks 36 and 38. The core end closure cap 68 is then again secured in frictional engagement with the open end 70 of the core mold 40.

Concurrently, the core mold 42 is confined between the first stage molding blocks 32 and 34 and its end closure cap 68 is secured in frictional engagement with its open end 70. The cores 40 and 42 are thereupon seated by the engagement of their seating rings 78 in the seating channels 56 and by the engagement of the positioning pins 57 with the axial recesses 73 in the second stage mold 35 and in the first stage mold 31, respectively.

Molten plastic of a different color than that used to form the socket 16 of the golf club grip 10 is then injected into the second stage mold formed by the second stage molding blocks 36 and 38. The flow of this molten plastic into the mold gate passageway formed by the longitudinal channels 100 and into the mold gating port formed by the transverse passageways 102 is indicated by the directional arrow 120 in FIG. 7. As in the first stage of molding, the molten plastic passes through the core inlet gate 91 of the core mold 40 without first entering the mold cavity defined by the depressions 98 of the second stage molding blocks 36 and 38. The molten plastic flows into the core inlet gate 91 of the core mold 40, into the core runner cavity 80 defined therein, and out through only the core ejection gates 82 and 86 into the vacant space within the mold cavity formed by the surfaces of the depressions 98 in the second stage molding blocks 36 and 38. Flow through the core ejection gates 84 and 88 is blocked by the structure of the socket 16 already formed on the outer surface 76 of the mold core 40. The flow through the core ejection gates 82 and 86 is not blocked, since there are no protrusions in the second stage mold corresponding to the protrusions 64 and 66 in the first stage mold. The flow of molten plastic through the core ejection gates 82 and 86 thereby forms the wide bands 19 and 21 on the narrower diameter portions of the socket 16 left to receive them.

In the second stage of molding the flow from the core ejection gates 84 and 88 is blocked by the structure of the socket portion 16 of the golf club grip 10, which has already been formed on the mold core 40. That is, the flow of molten plastic is restricted while utilizing the second stage outer mold 35 formed by the molding blocks 36 and 38 to only those portions of the second stage mold cavity 98 bounded between the interior walls of the depressions 98 in the second stage molding blocks 36 and 38 and the outer surfaces of the plastic small diameter portion of the socket structure 16. These tube-like portions are formed during the first stage of injection molding in the manner previously described utilizing the first stage outer mold 31.

The molding blocks 36 and 38 of the second stage outer mold 35 have interior walls that define the second stage mold cavity of the second stage mold cavity 98. The second stage mold cavity is greater than and totally encompasses the first stage mold cavity formed by the interior walls of the molding blocks 32 and 34 at the depressions 54. The interior walls of the molding blocks 36 and 38 of the second stage outer mold are spaced from the core ejection ports 82 and 86 that are blocked by the blocking projections 64 and 66 of the first stage mold cavity.

Concurrently, with the formation of the second stage molded portions 19 and 21 of the golf club grip 10, the same first stage injection process is taking place again within the first stage mold formed by the molding blocks 32 and 34 between which the mold core 42 is clamped. Thus, while the second stage of molding is taking place within the second stage molding blocks 36 and 38, the first molding stage is concurrently taking place to commence the production of another golf club grip 10.

The outer first and second stage molds formed by the pairs of molding blocks 32, 34 and 36, 38, respectively, are then both concurrently cooled, thereby solidifying molten plastic injected into the outer mold cavities of the respective molds into molded plastic structures mounted on the respective mold cores. Preferably, the molding process is carried out according to the teachings of U.S. Pat. No. 5,261,665, which is incorporated herein by reference in its entirety, so that physically cross linking and bonding occurs between the wide bands 18 and 20 and the main socket structure 16 to the overlying the bands 19 and 21. The molten plastic of different colors injected into the core runner cavities 80 and the core runner cavity extensions 94 of the two mold cores 40 and 42 is solidified concurrently.

The core end closures 68 are then removed from both of the mold cores 40 and 42 and the core runners 110 are extracted from the core runner cavities 80 of both of the mold cores 40 and 42 in the manner previously described and illustrated in FIG. 6. The mold halves of both the first and second stage molds are then drawn apart to the positions illustrated in FIG. 8.

At this point in time the golf club grip 10 has been completely formed on the mold core 40 and is ejected from the mold core 40 as described in U.S. Pat. No. 5,261,665. The core support 44 is then again rotated 180 degrees and the process is repeated cyclically to alternatively manufacture complete golf club grips 10 on the cores 40 and 42 on a continuous, mass production basis.

Undoubtedly, numerous variations and modifications of the invention will become readily apparent to those familiar with injection molding processes and injection molding apparatus. For example, the apparatus and the implementation of the method described illustrates the manufacture of a molded plastic article utilizing only two stages of molding. However, both the apparatus and the method are easily adapted to three, four, and even more stages of molding. Each stage of molding employs a separate set of molding blocks which define a mold cavity larger than and encompassing the mold cavities of the molding blocks of the prior stages.

The molding blocks of each stage, except for the final stage, include inwardly projecting protrusions that block flow from at least one core ejection gate. Also, while simple, annular band-shaped configurations in molding have been depicted and described in the drawings for ease of illustration and understanding, is quite possible to produce very complex shapes and patterns of plastic having different physical characteristics, such as color, on a single molded article of manufacture. Also, the different characteristics of the plastics need not necessarily be color only, nor color at all. For example, plastic having different hardnesses, elasticities, permeabilities, and other physical or chemical characteristics may be molded in the manner described herein. Accordingly, the scope of the invention should not be construed as limited to the specific embodiment depicted and manner of implementation of the method described, but rather is defined in the claims appended hereto.

I claim:

1. A method of molding a hollow plastic article utilizing at least one outer mold comprised of a plurality of molding blocks which separate along a parting interface and which, when positioned together, define an enclosed outer mold cavity therewithin, a hollow mold core having opposing ends, at least one of which is an open end, and defining a longitudinal axis extending between said opposing ends, and wherein said mold core has an outer surface and defines a core runner cavity therewithin that has a uniform cross section throughout relative to said longitudinal axis, and said core runner cavity extends through said open mold core end, and wherein at least one core ejection gate is defined within said core leading from said core runner cavity to said outer surface of said core, a core end closure that is positionable relative to said core to block said open end of said core end and which defines a core runner extension cavity therewithin that is in communication with said core runner cavity and is aligned on said longitudinal axis of said core, the steps comprising:

(a) withdrawing said molding blocks from each other,
(b) placing said mold core between said molding blocks,
(c) positioning said molding blocks together, thereby clamping said mold core therebetween at least partially within said outer mold cavity, (d) closing said open end of said mold core with said core end closure, (e) injecting molten plastic into said outer mold cavity through said core runner cavity and said core ejection gate, (f) cooling said outer mold and said mold core, thereby solidifying molten plastic injected into said outer mold cavity into a molded plastic structure mounted on said mold core and thereby solidifying molten plastic injected into said core runner cavity and said core runner extension into a solidified core runner occupying both said core runner cavity and said core runner extension cavity, (g) removing said core end closure from said open end of said mold core, thereby exposing that portion of said core runner solidified in said core runner extension cavity, (h) gripping said core runner by said exposed portion thereof and drawing said solidified core runner along said longitudinal axis completely out of said core runner cavity, (i) drawing said molding blocks apart; and (j) thereafter removing said molded plastic structure from said mold core.

2. A method according to claim 1 performed with at least first and second stage outer molds as aforesaid, wherein said molding blocks of said first stage outer mold have interior walls that define a first stage mold cavity and include port blocking extensions that extend into said first stage mold cavity and said mold blocks of said second stage outer mold have interior walls that define a second stage mold cavity which is larger in volume than said first stage mold cavity and which totally encompasses said first stage mold cavity and utilizing a mold core having a plurality of core ejection gates as aforesaid, comprising:

first performing steps (a) through (i) as aforesaid utilizing said first stage outer mold and blocking at least one of said core ejection gates during the performance of step (e) as aforesaid, and next performing steps (a) through (i) as aforesaid utilizing said second stage outer mold and employing a molten plastic in step (e) having at least one characteristic different from the molten plastic employed in step (e) utilizing said first stage outer mold.

3. A method according to claim 2 further comprising restricting the flow of molten plastic concurrently with the performance of step (e) while utilizing said second stage outer mold to only those portions of said second stage mold cavity bounded between said interior walls of said second stage molding blocks and said molded plastic structure formed during the performance of step (f) as aforesaid utilizing said first stage outer mold.

4. A method according to claim 2 further comprising utilizing molten plastics of different colors during the performance of step (e) as aforesaid utilizing said first stage outer mold and the performance of step (e) as aforesaid utilizing said second stage outer mold.

* * * * *